(12) United States Patent
Wu et al.

(10) Patent No.: US 12,128,456 B2
(45) Date of Patent: Oct. 29, 2024

(54) MEGASONIC CLEAN WITH CAVITY PROPERTY MONITORING

(71) Applicant: Applied Materials, Inc., Santa Clara, CA (US)

(72) Inventors: Banqiu Wu, San Jose, CA (US); Khalid Makhamreh, Los Gatos, CA (US); Eliyahu Shlomo Dagan, Sunnyvale, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 18/133,972

(22) Filed: Apr. 12, 2023

(65) Prior Publication Data

US 2023/0241649 A1    Aug. 3, 2023

Related U.S. Application Data

(62) Division of application No. 17/550,903, filed on Dec. 14, 2021, now Pat. No. 11,654,460.

(60) Provisional application No. 63/270,525, filed on Oct. 21, 2021.

(51) Int. Cl.
    *B08B 3/12*          (2006.01)
    *B08B 13/00*       (2006.01)
    *G01B 11/30*       (2006.01)

(52) U.S. Cl.
    CPC .............. *B08B 3/123* (2013.01); *B08B 13/00* (2013.01); *G01B 11/303* (2013.01)

(58) Field of Classification Search
None
See application file for complete search history.

(56) References Cited

U.S. PATENT DOCUMENTS

| | | |
|---|---|---|
| 7,585,686 B2 | 9/2009 | Verhaverbeke et al. |
| 7,718,011 B2 | 5/2010 | Fishkin et al. |
| 2002/0144708 A1 | 10/2002 | Kashkoush et al. |
| 2004/0132318 A1 | 7/2004 | Kim et al. |
| 2004/0163682 A1 | 8/2004 | Boyd et al. |
| 2006/0070641 A1 | 4/2006 | Kim |
| 2007/0084481 A1 | 4/2007 | Franklin |
| 2018/0350589 A1 | 12/2018 | Rebstock |

OTHER PUBLICATIONS

PCT International Search Report and Written Opinion for PCT/US2022/047268 dated Mar. 6, 2023, 9 pages.
Desai et al., Comparison of Bubble Size Distributions Inferred from Acoustic, Optical Visualisation, and Laser Diffraction, Colloids and Interfaces, Dec. 5, 2019, 20 pages, UK.

*Primary Examiner* — Eric W Golightly
(74) *Attorney, Agent, or Firm* — MOSER TABOA

(57) ABSTRACT

A method of cleaning a substrate in a megasonic cleaning chamber, comprises: flowing a cleaning fluid through a supply tube in a megasonic cleaning chamber toward a substrate; using a megasonic transducer to generate megasonic waves through the cleaning fluid and create cavities in the cleaning fluid; and using one or more sensors to determine properties of the cavities in-situ based on emissions received from the cavities. A non-transitory computer readable medium has instructions stored thereon that, when executed, causes the method to be performed.

20 Claims, 4 Drawing Sheets

MEGASONIC CLEAN WITH CAVITY PROPERTY MONITORING

CROSS-REFERENCE TO RELATED APPLICATIONS

This application is a divisional of U.S. application Ser. No. 17/550,903, filed Dec. 14, 2021 and issued as U.S. Pat. No. 11,654,460 on May 23, 2023, which claims benefit of U.S. provisional patent application Ser. No. 63/270,525, filed Oct. 21, 2021, both of which are herein incorporated by reference in their entirety.

FIELD

Embodiments of the present disclosure generally relate to a substrate processing equipment.

BACKGROUND

Megasonic clean chambers are used in the semiconductor industry for cleaning various types of substrates. Megasonic clean chambers generally use acoustic energy to create cavity implosions in a cleaning fluid directed at the substrate. However, large cavities in the cleaning fluid may damage substrates during cleaning.

Accordingly, the inventors have provided improved apparatus and methods for cleaning substrates in a megasonic clean chamber.

SUMMARY

Embodiments of megasonic cleaning chambers are provided herein. In some embodiments, a megasonic cleaning chamber includes: a chamber body defining an interior volume therein; a substrate support to support a substrate disposed in the interior volume; a supply tube comprising a transparent material configured to direct a cleaning fluid to the substrate support; a megasonic power generator coupled to the supply tube to provide megasonic power to the cleaning fluid; a megasonic transducer coupled to the megasonic power generator and the supply tube to create megasonic waves in the cleaning fluid and to form cavities in the cleaning fluid, wherein the megasonic transducer is configured to direct the megasonic waves and cavities toward the substrate support; and one or more sensors configured to generate a signal indicative of a property of the cavities in the cleaning fluid.

In some embodiments, a method of cleaning a substrate in a megasonic cleaning chamber includes: flowing a cleaning fluid through a supply tube in a megasonic cleaning chamber toward a substrate; using a megasonic transducer to generate megasonic waves through the cleaning fluid and create cavities in the cleaning fluid; and using one or more sensors to determine properties of the cavities in-situ based on emissions received from the cavities.

In some embodiments, a non-transitory computer readable medium having instructions stored thereon that, when executed, causes a method of cleaning a substrate in a megasonic cleaning chamber to be performed, the method including: flowing a cleaning fluid through a supply tube in a megasonic cleaning chamber toward a substrate; using a megasonic transducer to generate megasonic waves through the cleaning fluid, creating cavities in the cleaning fluid; and using one or more sensors to determine properties of the cavities in-situ based on emissions received from the cavities.

Other and further embodiments of the present disclosure are described below.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1:
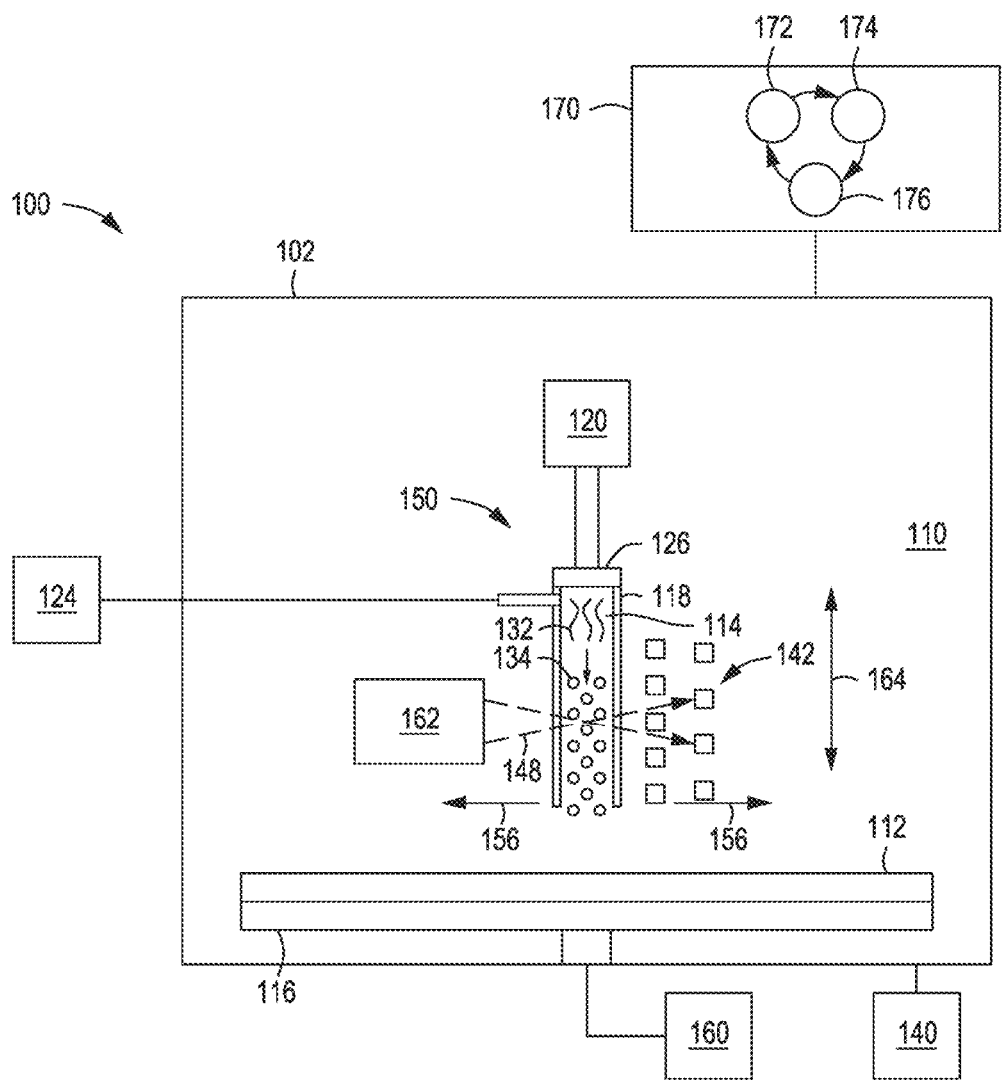
FIG. 1 depicts a schematic side view of a megasonic cleaning chamber in accordance with at least some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

Embodiments of megasonic cleaning chambers are provided herein. The megasonic cleaning chambers provided herein are configured to characterize cavities formed in the cleaning fluids in-situ. The cavities may be characterized by properties such as size, temperature, energy, shape, or the like. For example, the megasonic cleaning chamber may include one or more sensors that facilitate monitoring properties of the cavities or facilitate monitoring and control of the properties of the cavities. The megasonic cleaning chamber may include a controller configured to change one or more parameters of the megasonic cleaning chamber to control, for example, cavity sizes, temperatures, or cavity energies. By controlling the properties of the cavities within the cleaning fluid, the megasonic cleaning chamber can advantageously form cavities that are large enough to provide adequate cleaning force and small enough to prevent damage of substrates to be cleaned.

FIG. 1 depicts a schematic side view of a megasonic cleaning chamber, or cleaning chamber 100, in accordance with at least some embodiments of the present disclosure. The cleaning chamber 100 generally includes a chamber body 102 defining an interior volume 110 therein. The chamber body 102 may be made of any suitable material. A substrate support 116 may be disposed in the interior volume 110 to support a substrate 112 disposed in the interior volume 110. The substrate support 116 may be coupled to a motor 160 to facilitate rotational movement of the substrate support 116. The substrate 112 may be any substrate suitable for use in semiconductor applications.

The cleaning chamber 100 further includes a supply tube 118 disposed in the interior volume 110 to direct a cleaning fluid 114 to the substrate 112. The supply tube 118 is generally made of transparent material. In some embodiments, the supply tube 118 is made of quartz. In some embodiments, the supply tube 118 is a vertical tube extending orthogonally to an upper surface of the substrate 112. In some embodiments, the supply tube 118 may extend at an angle less than ninety degrees with respect to the upper surface of the substrate 112.

In some embodiments, a fluid supply 124 is coupled to the supply tube 118 to hold and supply cleaning fluid to the supply tube 118. In some embodiments, the cleaning fluid comprises a liquid-gas mixture. In some embodiments, the cleaning fluid comprises a liquid such as water, ammonium hydroxide, hydrogen peroxide, or the like. In some embodiments, the cleaning fluid comprises a gas such as hydrogen ($H_2$), oxygen ($O_2$), helium (He), nitrogen ($N_2$), argon (Ar), or a combination thereof. In some embodiments, the cleaning fluid may include a surfactant. In some embodiments, the fluid supply 124 is coupled to the supply tube 118 through a sidewall of the supply tube 118. A drain system 140 may be coupled to the chamber body 102 to drain cleaning fluids and contaminants. The drain system 140 may include one or more valves (not shown) to control a pressure in the interior volume 110 and one or more pumps (not shown).

The cleaning chamber 100 includes a megasonic power generator 120 coupled to the supply tube 118 to provide megasonic power to the cleaning fluid 114. In some embodiments, a megasonic transducer 126 is coupled to the megasonic power generator 120 and the supply tube 118 to create megasonic waves 132 in the cleaning fluid 114. The megasonic waves 132 in the cleaning fluid 114 lead to the formation of cavities 134 in the cleaning fluid 114. The megasonic transducer 126 is configured to direct the megasonic waves 132 and cavities 134 toward the substrate 112 to clean the substrate 112. In some embodiments, the megasonic waves have a frequency range of about 0.4 MHz to about 6.0 MHz.

Figure 2:
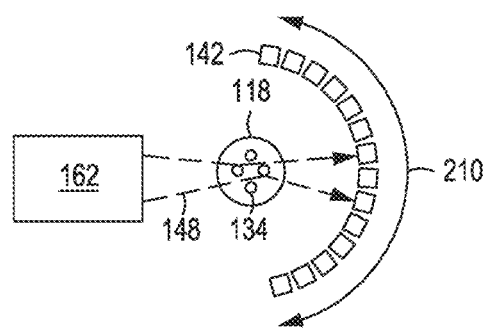
FIG. 2 depicts a schematic top view of a megasonic cleaning chamber in accordance with at least some embodiments of the present disclosure.

The cleaning chamber 100 includes one or more sensors 142 configured to facilitate determining properties of the cavities 134 in the cleaning fluid 114. For example, the one or more sensors 142 may generate a signal indicative of a property of the cavities 134 or may generate a signal to determine a property of the cavities 134. In some embodiments, the properties of the cavities 134 may be cavity size. In some embodiments, the cleaning chamber 100 further includes a laser source 162 disposed in the interior volume 110. In some embodiments, the laser source 162 and the one or more sensors 142 are configured to sense light from the laser source 162 to determine a size of the cavities 134 based on a measured diffraction of a laser beam from the laser source 162 after the laser beam passes through the cavities 134. In some embodiments, the one or more sensors 142 are a plurality of sensors disposed along a vertical position 164 of the supply tube 118. FIG. 2 depicts a schematic top view of portions of a cleaning chamber 100 in accordance with at least some embodiments of the present disclosure. In some embodiments, the plurality of sensors 142 are detectors. In some embodiments, the plurality of sensors 142 are disposed along a plurality of radial positions along an arcuate path 210 about the supply tube 118. In some embodiments, the plurality of sensors 142 are disposed about halfway or 180 degrees around the supply tube 118.

Referring back to FIG. 1, the supply tube 118, the megasonic transducer 126, and the one or more sensors 142 may collectively be referred to as an upper assembly 150. The upper assembly 150 may be configured to translate across the substrate support 116 in a lateral direction 156 so that an entire upper surface of the substrate 112 may be cleaned. The one or more sensors 142 may be coupled to the supply tube 118 via a mounting frame or other suitable coupling apparatus.

The cleaning chamber 100 may include a controller 170 to control the operation of the cleaning chamber 100. The controller 170 generally includes a central processing unit (CPU) 172, a memory 174, and a support circuit 176. The CPU 172 may be one of any form of a general-purpose computer processor that can be used in an industrial setting. The support circuit 176 is conventionally coupled to the CPU 172 and may comprise a cache, clock circuits, input/output subsystems, power supplies, and the like. Software routines, such as processing methods as described above may be stored in the memory 174 and, when executed by the CPU 172, transform the CPU 172 into a controller 170. The software routines may also be stored and/or executed by a second controller (not shown) that is located remotely from the cleaning chamber 100.

In operation, the controller 170 enables data collection and feedback from the cleaning chamber 100 to optimize performance of the cleaning chamber 100 and provides instructions to system components. For example, the controller 170 may be configured to use the one or more sensors 142 or signals from the one or more sensors 142 to determine sizes of cavities 134 or other cavity properties and modify one or more parameters of the cleaning chamber 100 to change the size or other cavity properties of the cavities 134. The memory 174 can be a non-transitory computer readable storage medium having instructions that when executed by the CPU 172 (or controller 170) perform the methods described herein.

Embodiments in accordance with the present disclosure may be implemented in hardware, firmware, software, or any combination thereof. Embodiments may also be implemented as instructions stored using one or more computer readable media, which may be read and executed by one or more processors. A computer readable medium may include any mechanism for storing or transmitting information in a form readable by a machine (e.g., a computing platform or a "virtual machine" running on one or more computing platforms). For example, a computer readable medium may include any suitable form of volatile or non-volatile memory. In some embodiments, the computer readable media may include a non-transitory computer readable medium.

Figure 3:
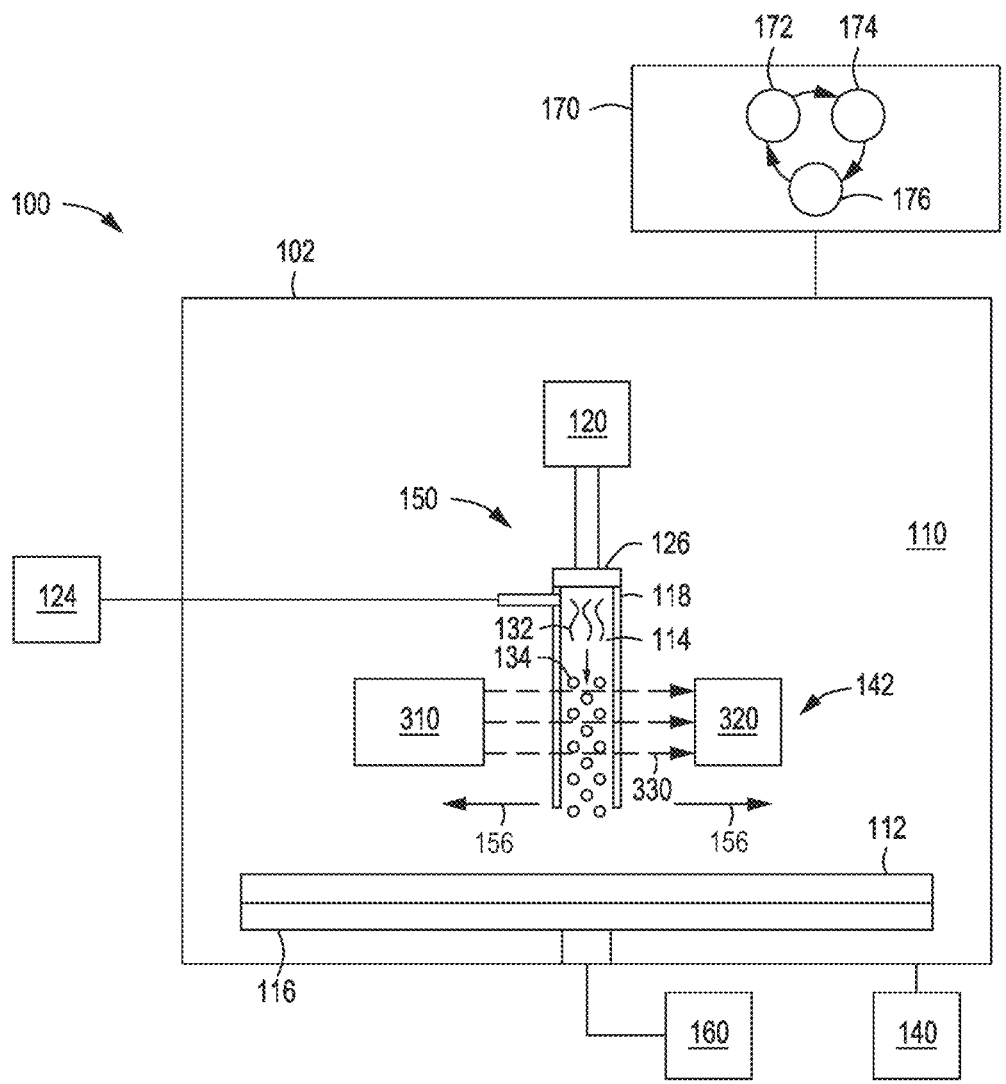
FIG. 3 depicts a schematic side view of a megasonic cleaning chamber in accordance with at least some embodiments of the present disclosure.

FIG. 3 depicts a schematic side view of a megasonic cleaning chamber in accordance with at least some embodiments of the present disclosure. In some embodiments, the cleaning chamber 100 comprises a light source 310 directed at the supply tube 118. The one or more sensors 142 may comprise a camera 320 having a high-speed photographic sensor configured to capture images of the cavities 134 illuminated by photons 330 from the light source 310 to determine the size of the cavities 134.

Figure 4:
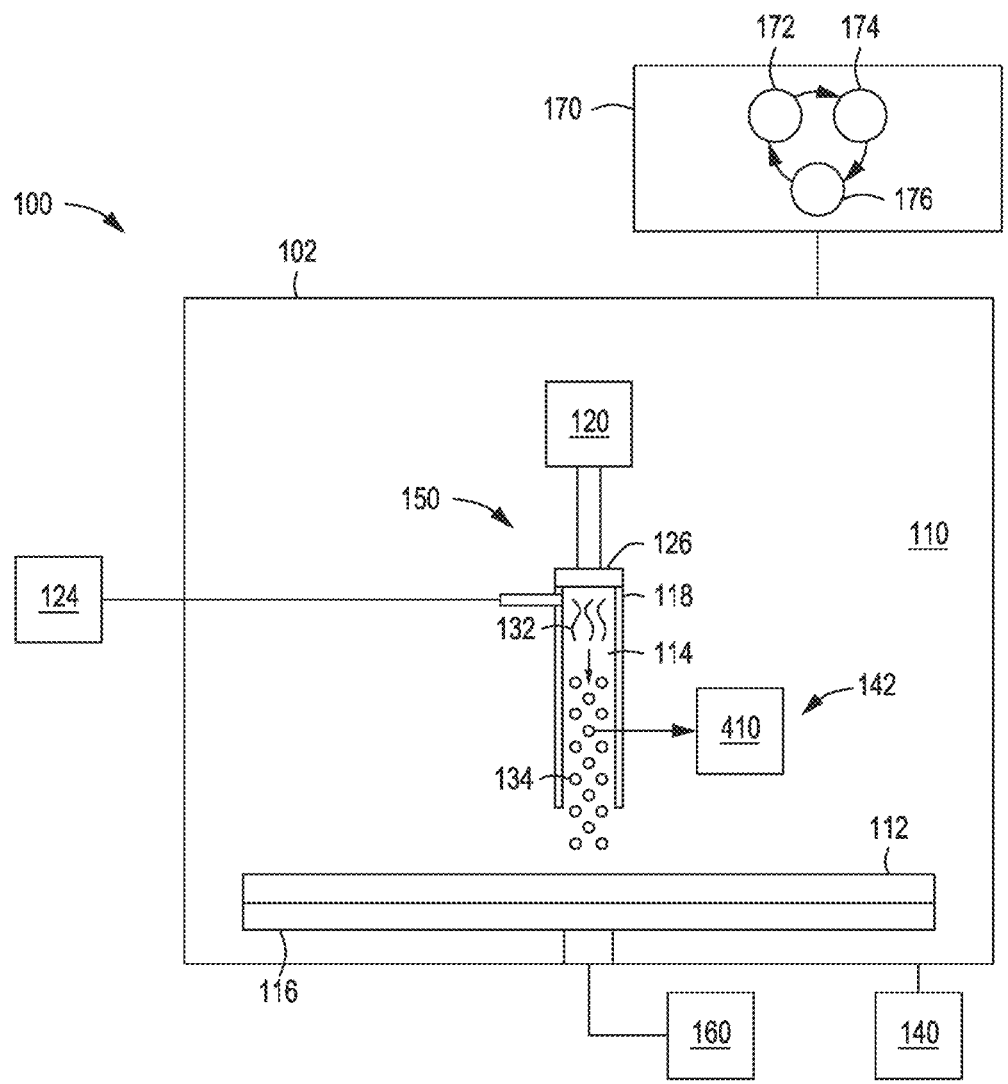
FIG. 4 depicts a schematic side view of a megasonic cleaning chamber in accordance with at least some embodiments of the present disclosure.

FIG. 4 depicts a schematic side view of a megasonic cleaning chamber 100 in accordance with at least some embodiments of the present disclosure. The megasonic cleaning chamber of claim 1, wherein the one or more sensors 142 comprise an optical emission spectrometer 410 to determine the wavelength and intensity of sonoluminescence emissions, or optical emission spectrum (OES), due to the cavities 134 in the cleaning fluid 114. For example, OES of the gas in the cavities 134. Based on the OES data, cavity properties such as cavity temperature, energy, cleaning performance, and possible propensity to damage the substrate 112 can be estimated. The OES emissions from the cavities 134 may be generated by the megasonic waves 132 passing through the cleaning fluid 114.

Figure 5:
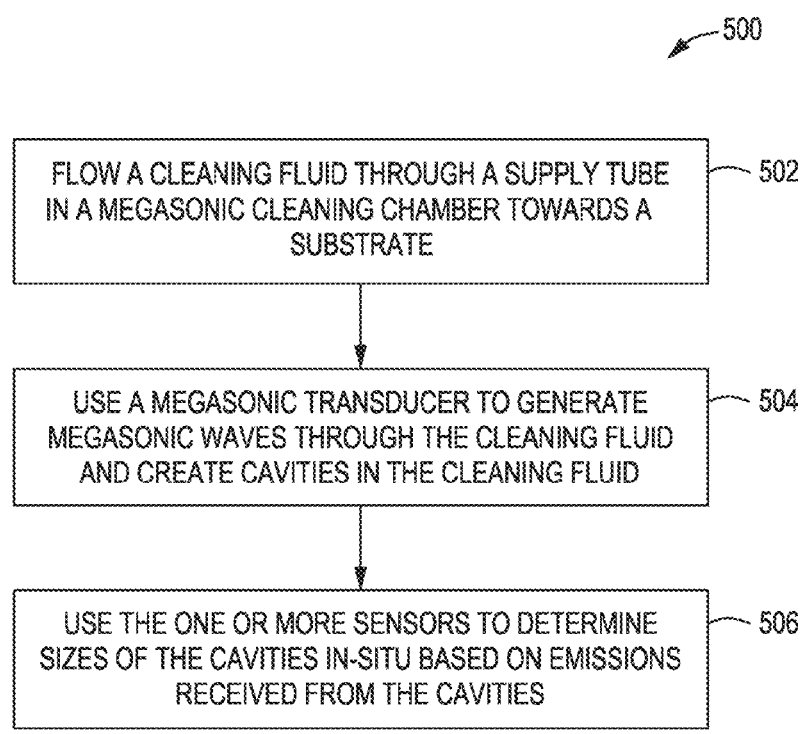
FIG. 5 depicts a flow chart of a method of cleaning a substrate in a megasonic cleaning chamber in accordance with at least some embodiments of the present disclosure.

FIG. 5 depicts a flow chart of a method 500 of cleaning a substrate in a megasonic cleaning chamber (e.g., cleaning chamber 100) in accordance with at least some embodiments of the present disclosure. At 502, the method 500 includes flowing a cleaning fluid (e.g., cleaning fluid 114) through a supply tube (e.g., supply tube 118) in a megasonic cleaning chamber toward a substrate (e.g., substrate 112).

At 504, the method 500 includes using a megasonic transducer (e.g., megasonic transducer 126) to generate megasonic waves (e.g., megasonic waves 132) through the cleaning fluid and create cavities (e.g., cavities 134) in the cleaning fluid. In some embodiments, the megasonic waves have a frequency range of about 0.4 MHz to about 6.0 MHz.

At 506, the method 500 includes using one or more sensors (e.g., one or more sensors 142) to determine cavity properties in-situ based on emissions received by the one or more sensors from the cavities. Properties such as cavity size may be determined from any suitable sensing technique, such as laser diffraction, optical, spectroscopy, or acoustic methods. For example, in some embodiments, using one or more sensors to determine sizes of the cavities based on emissions received from the cavities comprises: directing a laser (e.g., laser source 162) to the supply tube, detecting scattered laser light (e.g., scattered laser light 148) via the one or more sensors, and determining sizes of the cavities based on the detected scattered laser light.

In some embodiments, using one or more sensors to determine sizes of the cavities comprises using optical methods such as cameras for high-speed photography. For example, optical methods may include directing a light source (e.g., light source 310) to the supply tube, using a camera (e.g., camera 320) having the one or more sensors configured for generating images of the cavities, and determining sizes of the cavities based on the images. The light source may advantageously provide better contrast between a background and the cavities.

In some embodiments, using one or more sensors to determine cavity properties based on emissions received from the cavities comprises using an optical emission spectrometer (e.g., optical emission spectrometer 520) having the one or more sensors configured to detect light emissions from the cavities that are caused by the megasonic waves to determine, for example, cavity temperature and cavity energy. The cavity temperature and cavity energy may refer to the temperature or energy of the gas within the cavities. Based on the data from the optical emission spectrometer, cleaning performance, and possible damages can be estimated. In some embodiments, a controller (e.g., controller 170) may take OES data from the optical emission spectrometer to determine cavity sizes based on the OES data.

In some embodiments, the method 500 includes adjusting a parameter of the megasonic cleaning chamber if the determined properties, such as cavity size, cavity temperature, or cavity energy are outside of a desired range. In some embodiments, the parameter comprises one or more of power provided to the megasonic transducer by the megasonic generator, frequency of the megasonic waves, gas concentration in the cleaning fluid, or temperature of the cleaning fluid. For example, if the cavities are too small, one or more of: the power provided to the megasonic transducer by the megasonic generator, gas concentration in the cleaning fluid, or temperature of the cleaning fluid may be increased. If the cavities are too large, one or more of: the power provided to the megasonic transducer by the megasonic generator, gas concentration in the cleaning fluid, or temperature of the cleaning fluid may be decreased. In some embodiments, the desired range of the size of the cavities are about 1 micron to about 20 microns in diameter. In some embodiments, the parameters may be adjusted via an end user, via a controlled method using a controller, or artificial intelligence (AI) controlled method which is based on using a controller and data processing using any suitable AI technique.

In some embodiments, the method 500 includes rotating the substrate while flowing the cleaning fluid. In some embodiments, the method 500 includes moving the supply tube across the substrate while flowing the cleaning fluid to clean an entirety of the substrate.

While the foregoing is directed to embodiments of the present disclosure, other and further embodiments of the disclosure may be devised without departing from the basic scope thereof.

The invention claimed is:

1. A method of cleaning a substrate in a megasonic cleaning chamber, comprising:
   flowing a cleaning fluid through a supply tube in a megasonic cleaning chamber toward a substrate;
   using a megasonic transducer to generate megasonic waves through the cleaning fluid and create cavities in the cleaning fluid; and
   using one or more sensors to determine properties of the cavities in-situ based on emissions received from the cavities.

2. The method of claim 1, further comprising:
   adjusting a parameter of the megasonic cleaning chamber if the determined properties of the cavities are outside of a desired range.

3. The method of claim 2, wherein the parameter comprises one or more of power provided to the megasonic transducer, frequency of the megasonic waves, gas concentration in the cleaning fluid, or temperature of the cleaning fluid.

4. The method of claim 2, wherein the determined properties are sizes of the cavities, and wherein the desired range is about 1 micron to about 20 microns in diameter.

5. The method of claim 2, wherein the parameter is adjusted using a controller or an artificial intelligence technique.

6. The method of claim 1, wherein using one or more sensors to determine properties of the cavities based on emissions received from the cavities comprises:
   directing a laser to the supply tube;
   detecting scattered laser light via the one or more sensors; and
   determining sizes of the cavities based on the detected scattered laser light.

7. The method of claim 1, wherein using one or more sensors to determine properties of the cavities based on emissions received from the cavities comprises:
   directing a light source to the supply tube;
   using a camera having the one or more sensors to take images of the cavities; and
   determining sizes of the cavities based on the images.

8. The method of claim 1, wherein using one or more sensors to determine properties of the cavities based on emissions received from the cavities comprises using an optical emission spectrometer having the one or more sensors configured to detect light emissions from the cavities that are caused by the megasonic waves.

9. The method of claim 1, further comprising;
rotating the substrate while flowing the cleaning fluid; and
moving the supply tube across the substrate while flowing the cleaning fluid.

10. The method of claim 1, wherein the megasonic waves have a frequency range of about 0.4 MHz to about 6.0 MHz.

11. A non-transitory computer readable medium having instructions stored thereon that, when executed, causes a method of cleaning a substrate in a megasonic cleaning chamber to be performed, the method comprising:
flowing a cleaning fluid through a supply tube in a megasonic cleaning chamber toward a substrate;
using a megasonic transducer to generate megasonic waves through the cleaning fluid, creating cavities in the cleaning fluid; and
using one or more sensors to determine properties of the cavities in-situ based on emissions received from the cavities.

12. The non-transitory computer readable medium of claim 11, wherein the method of the computer readable medium further comprises:
adjusting a parameter of the megasonic cleaning chamber if the determined properties of the cavities are outside of a desired range.

13. The non-transitory computer readable medium of claim 12, wherein the parameter comprises one or more of power provided to the megasonic transducer, frequency of the megasonic waves, gas concentration in the cleaning fluid, or temperature of the cleaning fluid.

14. The non-transitory computer readable medium of claim 12, wherein the determined properties are sizes of the cavities, and wherein the desired range is about 1 micron to about 20 microns in diameter.

15. The non-transitory computer readable medium of claim 12, wherein the parameter is adjusted using a controller or an artificial intelligence technique.

16. The non-transitory computer readable medium of claim 11, wherein using one or more sensors to determine properties of the cavities based on emissions received from the cavities comprises:
directing a laser to the supply tube;
detecting scattered laser light via the one or more sensors; and
determining sizes of the cavities based on the detected scattered laser light.

17. The non-transitory computer readable medium of claim 11, wherein using one or more sensors to determine properties of the cavities based on emissions received from the cavities comprises:
directing a light source to the supply tube;
using a camera having the one or more sensors to take images of the cavities; and
determining sizes of the cavities based on the images.

18. The non-transitory computer readable medium of claim 11, wherein using one or more sensors to determine properties of the cavities based on emissions received from the cavities comprises using an optical emission spectrometer having the one or more sensors configured to detect light emissions from the cavities that are caused by the megasonic waves.

19. The non-transitory computer readable medium of claim 11, wherein the method of the computer readable medium further comprises;
rotating the substrate while flowing the cleaning fluid; and
moving the supply tube across the substrate while flowing the cleaning fluid.

20. The non-transitory computer readable medium of claim 11, wherein the megasonic waves have a frequency range of about 0.4 MHz to about 6.0 MHz.

* * * * *